United States Patent Office 3,154,716
Patented Oct. 27, 1964

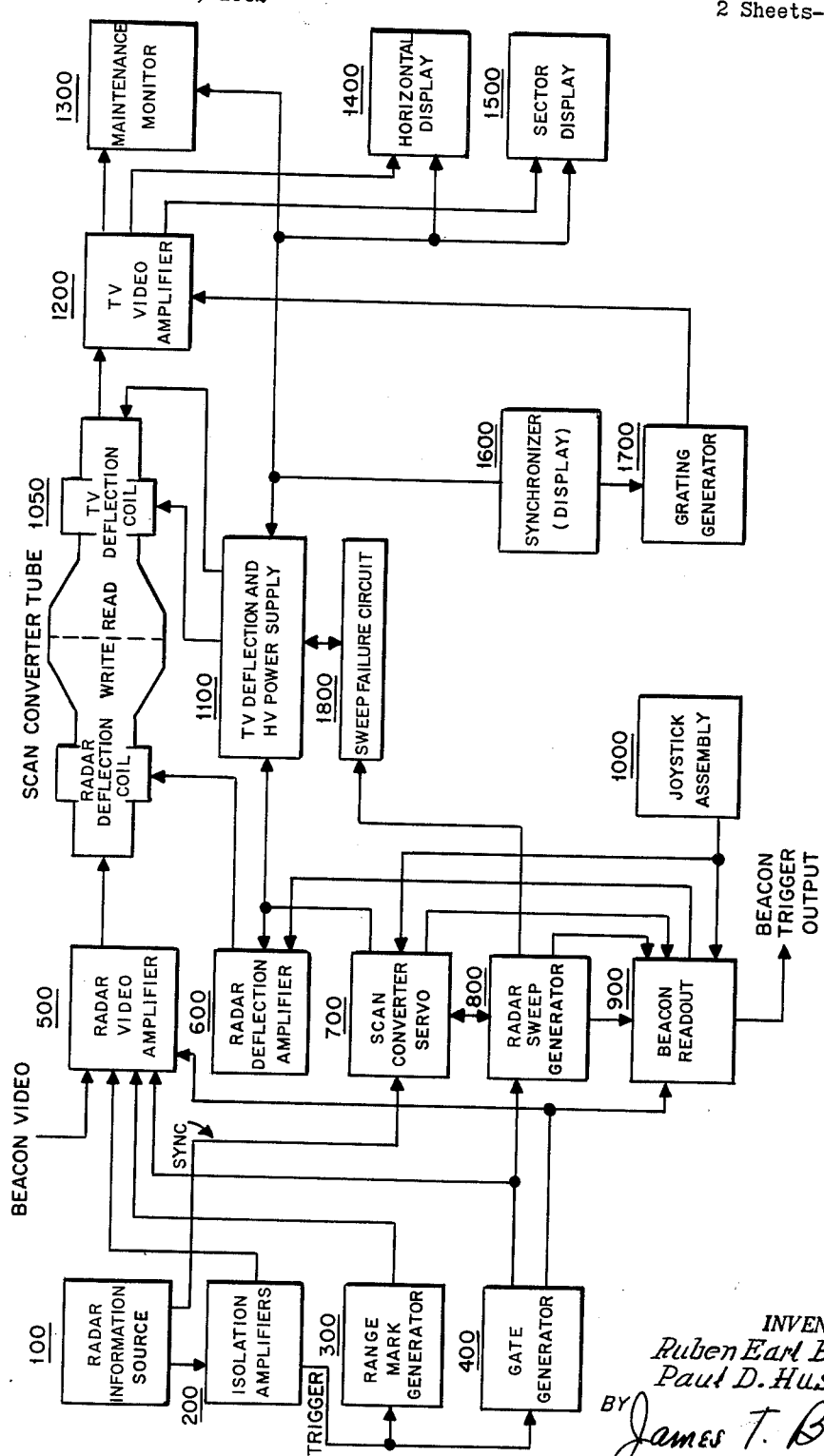

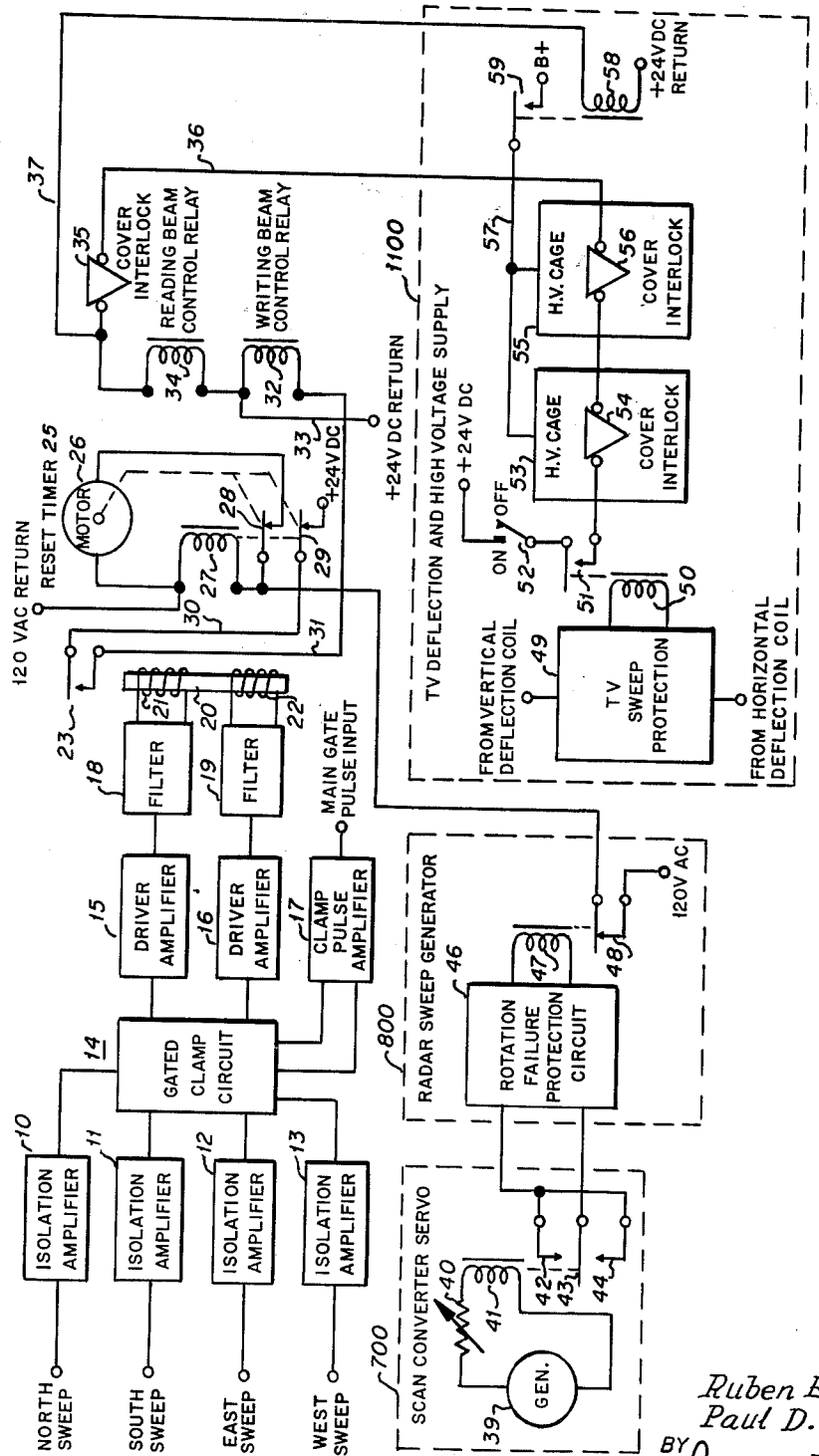

3,154,716
SCREEN PROTECTION CIRCUIT FOR RADAR DISPLAY DEVICE
Ruben Earl Beitz, Oak Park, and Paul D. Huston, Elmhurst, Ill., assignors to Admiral Corporation, Chicago, Ill., a corporation of Delaware
Filed June 6, 1962, Ser. No. 200,444
9 Claims. (Cl. 315—20)

This invention relates in general to radar control systems, and, in particular, to sweep protection circuits applicable for use in, for example, radar bright display control systems.

More particularly, this invention relates to sweep protection circuits for radar control systems of the type having a fixed yoke and resolved sweep scanning, as distinguished from those employing repetitive constant amplitude sweep scanning.

Radar has been used for yielding a visual indication of the position of objects, both stationary and moving, for a number of years. The visual indication is produced on the viewing screen of a cathode ray tube having high persistence phosphors, and is generally reinforced at a low repetition rate. The indications are characterized by bright spots which fade in intensity as the cathode ray tube electron beam scans the remaining parts of the screen. Even at best (using a short range radar having a high pulse repetition frequency and good phosphors) it is difficult to achieve sufficient brightness to directly view the cathode ray tube screen under ambient light conditions. Consequently, for the usual type of radar installation, the display tube must be viewed in a darkened room.

Radar bright display systems obviate this disadvantage. Radar bright display systems generally utilize a scan conversion storage tube which, in essence, is a radar display tube and television camera tube joined together through the medium of a charged storage layer. The tube obviously has no visual properties. On the writing side of the tube, the electron beam excites the storage layer resulting in an electrical characterization of the radar image being put on the storage layer. On the television or reading side of the tube, the electron beam (over many scans) erases the charges, and in the process, the electrical characterization is picked off the storage layer. With the scan conversion storage tube the "image" has an extremely high persistency, and very bright displays may be achieved by using television techniques. Thus, with the scan conversion storage tube, it is feasible to convert from the angular sweep system necessary for radar display to a rectangular sweep system utilized in television systems. The advantage of the television sweep system is, of course, obvious, since there are 30 complete pictures placed on the television cathode ray tube each second.

In radar bright display systems of this type, as well as in many other electronic systems employing cathode ray tubes or electron beam image scanning devices, an electron gun is used for beam forming purposes, and an associated high potential is used for accelerating the beam of electrons which is focused at the phosphor screen. Normal operating conditions establish a condition where the energy dissipated at a particular point on the cathode ray tube phosphor being scanned is of a relatively low average level as long as scanning is maintained. However, if this scanning action is interrupted, the total energy of the high voltage electron beam is concentrated at a particular point on the normally scanned area. If this condition prevails, for even short intervals, damage to the cathode ray tube phosphor results. In order to prevent damage to the cathode ray tube phosphor, it is therefore imperative that protection be afforded in the event of interruption of the scanning process.

Protection methods in current use are normally based on the removal of high voltage or the interruption of the electron beam, or both. In order to initiate the protection, several methods have been devised for sensing the scanning failure in the case of electromagnetic deflection. The sensing methods disclosed by the prior art invariably sense scanning failure by detecting the absence of an A.C. component in the yoke. While this manner of sensing scanning failure is quite reliable in the repetitive constant amplitude type of scan, that is, where the sweep voltage varies linearly with time, it cannot be used in systems having a fixed yoke and using resolved sweep scanning where the deflection A.C. component is made to vary in accordance with a sine or cosine function. The evaluation of $E$ (sin $\theta$) or $E$ (cos $\theta$) shows that an amplitude of zero at two specific points, over an interval of $2\pi$, is realized. The conventional scanning failure sensing method, therefore, would interpret these specific zero amplitude conditions as loss of scanning, and the protection circuitry would be falsely activated.

It is therefore the principal object of this invention to provide a new and improved sweep failure protection circuit for electron beam image scanning devices having a fixed yoke and a resolved sweep scanning scheme.

It is a further object of this invention to provide a new and improved sweep failure protection circuit for electron beam image scanning devices having a fixed yoke and a resolved sweep scanning scheme wherein there is further incorporated antenna malfunction protection.

It is a still further object of this invention to provide a new and improved sweep failure protection circuit for electron beam image scanning devices having a fixed yoke and a resolved sweep scanning scheme for a writing electron beam and a television scanning scheme for a reading electron beam for protecting said device against either writing beam or reading beam sweep failure and also for protecting the device against antenna malfunction.

The invention, both as to its organization and method of operation, taken with these and further objects not specifically mentioned, will best be understood by reference to the following description taken in conjunction with the accompanying drawings, in which:

FIG. 1 is a block diagram of a radar bright display system in accordance with this invention;

FIG. 2 is a block diagram of a protection circuit in accordance with this invention.

Referring now to FIG. 1 there is shown a simplified block diagram of a radar bright display system. It should be understood that the lines interconnecting these blocks may actually represent many connections, and that this method of presentation is utilized for clarity in describing the overall operational functions.

Radar information source 100 comprises a source of normal radar video information, such as that from the radar antenna installation, locally generated map information, moving target information (MTI), a radar trigger or pre-trigger pulse and synchronizing information, hereafter referred to as sync, which is utilized to correlate the radial scanning on the writing side of storage tube 1050 with the angular rotation of the radar antenna.

All of the radar information except the sync portion is coupled to isolation amplifiers 200 which individually amplify any of the received information enumerated above and couple it to corresponding inputs in radar video amplifier 500. The sync portion of the radar signal is coupled to the scan converter servo 700.

The amplifier in isolation amplifiers 200 responsible for translating the trigger or pre-trigger pulse has its output coupled to range mark generator 300 and gate generator 400. If a pre-trigger pulse is utilized, suitable delay networks must be incorporated in these generators. If a trigger pulse is utilized, obviously no such delay networks are required. The purpose of the trigger pulse is to simultaneously initiate operation of the radar electronic equipment. The range mark generator includes circuitry for developing the requisite video signals for producing concentric range rings on the display tube, which rings corrsepond to prescribed distances from the antenna. On the display tube, the center represents the antenna and the radius the maximum radar range. The concentric range rings may be spaced any desired number of "miles apart." The output of range mark generator 300 is coupled to radar video amplifier 500.

Gate generator 400 is responsible for generating voltages for starting the radar sweep generator 800 and for time sharing the radar video amplifier 500 between certain of the video inputs. It also generates a beacon gate pulse which activates the beacon circuit which will be more fully described hereinafter. The radar sweep circuit 800, in conjunction with scan converter servo 700 develops the necessary resolved sweep voltages, which when applied to the fixed writing side deflection coils of the scan converter tube, result in an angular sweep of the input beam.

During the radar dead time, provision is made to place the writing beam under control of beacon readout unit 900. At this point suffice it to say that the radar sweep is time shared with the beacon sweep. To this end radar sweep generator 800 is coupled to beacon readout unit 900, which in turn is coupled to radar deflection amplifier 600 where the composite resolved sweep signal is amplified and fed to the fixed deflection coils on the writing side of scan converter tube 1050.

Joystick Assembly 1000 is a mechanical arrangement located on the horizontal display console. By movement of the Joystick the operator can control the position of a beacon marker and physically place it over a radar target indication on the horizontal display console. Joystick Assembly 1000 is thus shown connected to scan converter servo 700 and beacon readout unit 900. The rectangular coordinates of the position of the beacon marker are converted by the scan converter servo into the angular coordinates corresponding thereto. In effect operation of the Joystick causes a marker to be placed upon the writing storage layer of scan converter tube 1050 and simultaneously generates a beacon trigger output signal which is indicative of the position of the beacon marker.

The beacon trigger output signal is coupled to other equipment (not shown) to trigger this equipment for performing various beacon functions such as identification of the object. Assuming that the object is an airplane, it will carry receiving and transmitting equipment so that when a beacon signal is received, it automatically transmits identifying information. If the proper information is received, the object may be considered to be identified and the beacon equipment will send back to the radar system video amplifier 500 a beacon video signal of some type which is placed upon the scan converter tube storage layer at the point where the identified object appears. Of course, the display tube will then yield a visual indication of the beacon video.

This, in general, summarizes the operation of the radar portion of the radar bright display system. The television portion of the system follows very closely conventional television techniques.

A synchronizer 1600 generates the required horizontal and vertical sync pulses. These pulses are fed to TV deflection circuit 1100, which is coupled to the reading side of scan converter tube 1050, maintenance monitor 1300 which is a display unit that may be used to monitor the operation of the system, horizontal display console 1400 and sector or vertical display 1500. These later units are merely display units mounted to provide a display on a horizontal viewing plane and a vertical viewing plane, respectively. Additionally, synchronizer 1600 controls a gating generator 1700 which contains circuitry for selectively generating a horizontal line pattern, a vertical line pattern, a cross hatch pattern or a dot pattern for checking the operation of the television portion of the system. The gating generator output is coupled to television video amplifier 1200. It should be noted that television video amplifier 1200 may contain a number of individual amplifiers, as it should be obvious that many television displays may be operated from this bright display system. The reading side of scan converter tube 1050 essentially comprises a television camera in which the picture area is subjected to rectangular scan rather than radial scan. Synchronizer 1600 coordinates the scan in the reading side of scan converter tube 1050 with the scan in all of the television display apparatus. The various charge patterns developed by the writing beam on the storage layer in tube 1050 are sensed by the writing beam and converted into video information which is amplified by TV video amplifier 1200. This information is then applied to the various television display units to create the total bright display radar presentation.

Referring now to FIG. 2, only the details of the scan converter storage tube sweep failure protection circuit 1800 which are necessary to understand the invention are shown for the sake of clarity. The function of the sweep protection circuit 1800 is to cut off either the writing electron beam from the radar portion of scan converter storage tube 1050, or to cut off the reading electron beam and the high voltage supplies from both the radar and the television portion in case of a malfunction which would cause either of the electron beams to stop scanning, thereby possibly damaging the delicate target surfaces. Circuitry is also incorporated to give protection in case of antenna rotation malfunction. In addition, several interlock switches give protection when the covers are removed from the high voltage cages and from the storage tube assembly.

Isolation amplifiers 10–13 serve as the input to the sweep protection circuitry and provide isolation between the sweep protection circuitry and the north, south, east and west sweep amplifiers (not shown) in the radar deflection amplifier 600. A gated clamp circuit 14 is connected in the outputs of isolation amplifiers 10–13 and functions to gate the positive portions of the sweep signal outputs of these amplifiers to the input of driver amplifiers 15 and 16. A clamp pulse amplifier 17 is coupled to gated clamp circuit 14 and functions to couple gating pulses thereto.

It may be recalled that during the radar dead time the writing beam is placed under control of beacon readout unit 900, that is, the radar sweep is time shared with the beacon sweep. Furthermore, provisions are also incorporated in the radar sweep circuitry for varying the radar sweep time as well as the pulse repetition period. The resolved radar sweep period, therefore, is only a portion of the total pulse repetition period. The gate generator 400 generates a main gate pulse which corresponds to the radar resolved sweep period, and this main gate pulse is coupled to clamp pulse amplifier 17. Clamp pulse amplifier 17 amplifies the main gate pulse and couples it to gated clamp circuit 14 to allow sweep signals to be coupled to driver amplifiers 15 and 16 only during the resolved sweep period.

Filter networks 18 and 19 are connected to the outputs of driver amplifiers 15 and 16, respectively. Filter networks 18 and 19 function to filter the D.C. voltage from the rectified sweep signals and may be adjusted to compensate for the particular pulse repetition period which is used at any given time. The outputs of filter networks 18 and 19 are connected to windings 21 and 22 of sweep protection relay 20, respectively.

A writing beam control relay 32 controls the presence of the writing electron beam. When writing beam control relay 32 is energized it closes its contacts (not shown) and energizes the radar writing electron beam circuitry (not shown). The manner in which the radar writing electron beam circuitry is energized when these contacts are closed is not the essence of this invention and may be accomplished in any manner desired. The winding of writing beam control relay 32 is connected in series in an energizing circuit including a source of 24 v. D.C. potential and make contact 23 of sweep protection relay 20. As shown, when sweep protection relay 20 is energized, 24 v. D.C. is coupled through switch 29 (which will be explained), make contact 23 of sweep protection relay 20, the winding of writing beam control relay 32, to the 24 v. D.C. return, and writing beam control relay 32 is maintained energized.

Scan converter servo 700 includes a tachometer (generator) 39 connected in series with a variable resistance 40 and a relay 41 as its output load. Tachometer 39 is actually a generator whose output is a D.C. voltage proportional to the speed of rotation of the synchro rotors, or in other words, the antenna. The variable resistance 40 is adjusted to cause relay 41 to operate at a predetermined antenna rotation speed. Relay 41 has an armature 43 and two make contacts 42 and 44. When relay 41 is deenergized both make contacts 42 and 44 are opened. Relay 41 is energized to operate its make contact 42 or 44 in either direction of antenna rotation. That is, when it rotates in one direction make contact 42 is closed and when it is rotated in the opposite direction make contact 44 is closed.

Radar sweep generator 800 includes a rotation failure protection circuit 46 and a relay 47 having a break contact 48. Circuit 46 is energized by means of relay 41 of the scan converter servo 700. As long as the antenna is rotating properly relay 41 is energized and, in turn, energizes circuit 46. An energizing potential is developed by circuit 46 for energizing relay 47 connected thereto.

A reset timer 25 includes a motor 26, a pair of cams (not shown), a latching coil 27 and two snap-action switches (shown as contacts 28 and 29). Motor 26 is included in an energizing circuit which extends from the 120 v. A.C. source, through break contact 48 of relay 47, switch 28, motor 26 to the 120 v. A.C. return. Latch coil 27 is likewise connected in an energizing circuit which extends from the 120 v. A.C. source, through break contact 48 of relay 47, latching coil 27, to the 120 v. A.C. return. Switch 29 is connected in the previously described energizing circuit for writing beam control relay 32. Motor 26 when energized turns the pair of cams (not shown). These cams are set to provide a time delay of approximately 4 seconds, and after this delay to operate switches 28 and 29. When switch 28 is opened the energizing circuit for writing beam control relay is, in turn, opened. Latching coil 27 holds switches 28 and 29 in this position until the malfunction is corrected.

TV deflection and high voltage supply 1100 includes TV sweep protection circuit 49 which controls a relay 50 connected thereto. TV sweep protection circuit 49 receives a sample of the horizontal and vertical sweep signals and develops an energizing potential for relay 50. Relay 50 controls the B+ applied to the high voltage circuitry included in the high voltage cages 53 and 55. Reading beam control relay 34 like the writing beam control relay controls the reading beam circuitry, that is, contacts of reading beam control relay 34 (not shown) control the energization of the reading beam circuitry. A 24 v. D.C. energizing circuit is also included for relay 50 and the reading beam control relay 34. This energizing circuit in the case of reading beam control relay 34 extends from the 24 v. D.C. source, through on-off switch 52, make contact 51 of relay 50, cover interlocks 54 and 56 of high voltage cages 53 and 55, respectively, cover interlock 35 of the scan converter assembly, winding of reading beam control relay 34, to the 24 v. D.C. return. Relay 50 is energized from the same 24 v. D.C. via conductor 37 to the 24 v. D.C. return.

More specifically, the sweep signal outputs of the north, south, east and west sweep signal amplifiers are coupled to isolation amplifiers 10–13, respectively. The main gate pulses coupled to clamp pulse amplifier 17 are amplified and coupled to gated clamp circuit 14. The sweep signals coupled to gated clamp circuit 14 are clamped, and during the main gate pulse, the positive-going portions only of these sweep signals are gated through gated clamp circuit 14 to driver amplifiers 15 and 16.

Driver amplifiers 15 and 16 amplify and limit the north-south sweep signals and the east-west sweep signals, respectively. The output signals from driver amplifiers 15 and 16 are coupled to filters 18 and 19, respectively, which rectify and filter these signals.

Sweep protection relay is a sensitive, fast-acting relay which has two windings 21 and 22. Two modes of operation may be established in order to provide protection against sweep failure, depending upon the manner in which sweep protection relay is caused to operate. In accordance with one of these modes, windings 21 and 22 both must be energized in order to operate relay 20. When operating in this mode, the signal output level of driver amplifier 15 is limited to a value just below the signal power required to operate relay 20. That is, while relay 20 could be operated on only one winding, winding 21 for example, in this case the energizing signal is limited to a value just below the operate point. The signal output level of driver amplifier 16 is limited in a similar manner. If the sweep circuits are functioning properly, a signal will be present at the output of both driver amplifier 15 and driver amplifier 16, except during the time the sweep signals coupled to amplifiers 15 and 16 are passing through the cardinal points north and south and east and west, respectively. These signals are rectified and filtered by filters 18 and 19, and are coupled to windings 21 and 22 of sweep protection relay 20, respectively. With windings 21 and 22 both energized, sweep protection relay 20 operates and closes its contact 23. This completes the previously described energizing circuit for writing beam control relay 32.

It has been previously stated that the problem encountered in providing sweep failure protection for systems having a fixed yoke and a resolved sweep scanning scheme is that the deflection A.C. component is made to vary in accordance with a sine or cosine function. In such cases, the evaluation of $E(\sin \theta)$ or $E(\cos \theta)$ shows that an amplitude of zero at two specific points, over an interval of $2\pi$, is realized. An investigation of the signal outputs of driver amplifiers 15 and 16 as impressed on filters 18 and 19 reveals that these signals are out of phase and that when the signal impressed on filter 18 is maximum the signal impressed on filter 19 in minimum. Furthermore, since these input signals are amplified and limited to a pre-established level, the current out of filter 18 in the above-mentioned case is the maximum which it will obtain. The current out of filter 19 will have a value somewhat less than maximum. Moreover, if filtering were not used, sweep protection relay 20 would drop out. The rectified and filter signals, however, prevent sweep protection relay 20 from dropping out only when signals appear at the outputs of both driver amplifiers 15 and 16. An investigation of the relay 20 winding currents reveals that the sum of the outputs of both filters 18 and 19 are coupled to windings 21 and 22 never decays to a value less than the pre-established operating level of sweep protection relay 20. If one or the other, or both, of the signals appearing at the outputs of driver amplifiers 15 and 16 are absent due to sweep failure, sweep protection relay 20 will drop out as soon as the sum of the currents in the two windings 21 and 22 decays to a value less than the pre-established operating level. This is true since the current in one winding alone is not sufficient to energize sweep protection relay 20. When sweep protection relay 20 drops out, the writing beam control relay 32 is deenergized, and the writing beam is cut-off, in the manner previously described.

A second mode of operation may be established in the following manner. In this second mode, the level of the signals clamped through gated clamp circuit 14 and driver amplifiers 15 and 16 is established such that a current coupled to either winding 21 or winding 22 of sweep protection relay 20 is sufficient to energize it to cause it to operate. A signal output from either driver amplifier 15 or driver amplifier 16, therefore, is sufficient to operate sweep protection relay 20. Filters 18 and 19 function in a fashion similar to that in the first described mode of operation. That is, filters 18 and 19 rectify and filter the signal outputs of driver amplifiers 15 and 16 to prevent sweep protection relay 20 from following the pulse repetition frequency. The filter capacitors (not shown) included in filters 18 and 19 are selected such that the signal output from filter 18 or filter 19 decays to a level below the operating level of sweep protection relay 20 during the time the sweep passes through the cardinal points. During normal operating conditions, that is, when sweep signals are present at the outputs of north, south, east and west sweep amplifiers (indicating that the sweep circuits are functioning properly), the sum of the decaying signals is always sufficient to maintain sweep protection relay 20 operated. If sweep failure occurs, however, the output signal from filter 18 or 19, or both, decays to zero. Under these conditions, during the absence of a gated pulse the signal impressed on winding 21 or 22, depending upon which channel signal is lost, decays below the operating level required to maintain sweep protection relay 20 operated and it drops out. The energizing circuit for writing beam control relay 32 is opened at contact 23 and the writing beam is cut off, as previously described. Sweep protection relay will again operate when the gated pulse reappears since signals will again be passed through gated clamp circuit 14 and hence to one or the other winding 21 or 22. As long as writing beam is being swept in this manner, however, and is not concentrated at one spot on the storage screen of the scan converter storage tube 1050 the screen is not damaged.

As long as the antenna is rotating properly, the sweep protection circuitry functions in one or the other of the two manners described above, depending upon which mode of operation is established. If antenna rotation malfunction occurs, however, the beam will no longer be rotated as it normally is. The full sweep energy, therefore, will be concentrated on one particular area on the screen of the scan converter storage tube 1050, in the form of a line. If this condition exists for more than a few seconds time the screen of scan converter storage tube 1050 could be damaged. The rotation malfunction circuitry of this invention functions to prevent this from occurring. This may be explained as follows. Relay 41 is deenergized since it does not receive sufficient energizing current to maintain it operated, and its contact 42, or 44, is opened. This, in turn, deenergizes rotation failure protection circuit 46 and hence relay 47. Relay 47, when deenergized, closes its contact 48 and the 120 v. A.C. is extended to motor 26 and latching coil 27 of reset timer 25. Motor 26 turns the set of cams (not shown) associated with the two snap action switches (represented as contacts 28 and 29) to provide a time delay of approximately 4 seconds, as previously described. If the malfunction is corrected before this time elapses, reset timer 25 is immediately restored and no further action takes place. However, if the malfunction is of longer duration, switches 28 and 29 are actuated. Switch 29 opens the energized circuit of writing beam control relay 32, thus deenergizing the writing beam circuitry. Switch 28 opens the energizing circuit for motor 26. Latching coil 27 holds switches 28 and 29 in these positions until the malfunction is corrected.

The operation of the system in case of loss of the television beam sweep current may be explained as follows. Under normal operating conditions, the horizontal and vertical sweep currents are both present and hence relay 50 is normally energized. Also, ON-OFF switch 52 is in the ON position and all of the cover interlocks 54, 56 and 35 are closed. The +24 v. d.c. energizing circuits for reading beam control relay 34 and relay 58 are therefore closed, and these relays are energized. Relay 58 maintains B+ on the high voltage circuitry and reading beam control relay 34 maintains the reading beam circuitry energized. If the horizontal sweep current or the vertical sweep current is interrupted, TV sweep protection circuit 49 is rendered inoperative and relay 50 is deenergized. When the malfunction is corrected sweep protection circuit 49 is operative and energizes relay 50. Energized relay 50 closes its contact 51 and the +24 v. d.c. energizing circuits for reading beam control relay 34 and relay 58 are energized. Energized relay 58 reapplys B+ to the high voltage circuits and energized relay 34 restores the reading beam.

It may be noted that the high voltage sources to the radar portion and the television portion of the radar bright display system are cut off only during the failure of the television sweep signals, or when one of the cover interlocks 53, 55 and 35 are opened. The reason for cutting off the high voltage when one of the interlocks is broken is obvious. An additional advantage is gained, however, by not cutting off the high voltage during failure of radar sweep signals. In many cases radar information is coupled to the radar bright display system by radar microwave links. In certain areas of the country the environmental conditions are such that these microwave links are momentarily interrupted numerous times during the operating period of the system. Each time this occurs the writing beam is cut off, that is, displaced from the screen of the scan conversion storage tube 1050. When the link is re-established the writing beam is immediately restored. Since the high voltage is not cut off the reading beam is still scanning thus the information written on target can still be read on the display. If, however, the high voltage is cut off each time it is again applied the display is blurred for several minutes. The television signals normally are not subject to frequency interruptions. Removing the high voltage when the television sweep signals fail, therefore, does not have the detrimental effect that it does in the case of loss of radar sweep signals. Of course, it is obvious that the high voltage need not be interrupted by loss of television sweep signals. Another energizing circuit solely for maintaining reading beam control relay 34 operated could be included. Coupling the energizing circuits for the reading beam control relay 34 and relay 58 in this manner reduces the circuitry required.

The detailed description of the particular embodiments of the invention illustrated and described herein is not to be construed as limiting the invention thereto. The true spirit and scope of this invention is to be limited only by the claims appended hereto.

What is claimed is:

1. A protection circuit for an electron beam image scanning device having a fixed yoke and resolved sweep scanning circuitry including north, south, east and west sweep signal amplifiers comprising:

isolation means coupled to each of said north, south, east and west sweep signal amplifiers for isolating said north, south, east and west sweep signal amplifiers from said protection circuit;

first and second driver amplifier means coupled to said isolation means for amplifying and limiting signals coupled thereto;

means coupled, respectively, to said first and second driver amplifier means for rectifying and filtering signals coupled thereto;

relay means having a first and a second winding coupled, respectively, to said last-mentioned means, said relay means operated in response to the sum of currents flowing in said first and second winding reaching a predetermined value;

writing beam control means for controlling the presence of said electron beam in said device; and an energizing circuit including said writing beam control means and said relay means for energizing said writing beam control means under the control of said relay means, whereby said writing beam control means controls the presence of said electron beam responsive to said relay means.

2. A protection circuit for an electron beam image scanning device having a fixed yoke and resolved sweep scanning circuitry including north, south, east and west sweep signal amplifiers comprising:

isolation amplifier means coupled to each of said north, south, east and west sweep signal amplifiers;

first and second driver amplifier means;

clamp circuit means coupled to said isolation amplifier means for coupling signals to said first and second driver amplifier means;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said electron beam in said device; and an energizing circuit including said writing beam control means and said relay means for energizing said writing beam control means under the control of said relay means, whereby said writing beam control means controls the presence of said electron beam responsive to said relay means.

3. A protection circuit for an electron beam image scanning device having a fixed yoke and resolved sweep scanning circuitry including north, south, east and west sweep signal amplifiers comprising:

isolation amplifier means coupled to each of said north, south, east and west sweep signal amplifiers;

first and second driver amplifier means;

a gated clamp circuit coupled to said isolation amplifier means for coupling signals to said first and second driver amplifier means;

means coupled to said gated clamp circuit for coupling gating signals thereto;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said electron beam in said device; and an energizing circuit including said writing beam control means and said relay means for energizing said writing beam control means under the control of said relay means, whereby said writing beam control means controls the presence of said electron beam responsive to said relay means.

4. A protection circuit for an electron beam image scanning device having a fixed yoke and resolved sweep scanning circuitry including north, south, east and west sweep signal amplifiers comprising:

isolation amplifiers means coupled to each of said north, south, east and west sweep signal amplifiers;

first and second driver amplifier means coupled to said isolation amplifier means;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

a writing control relay for controlling the presence of said electron beam in said device;

an energizing circuit including said writing beam control relay and said relay means for energizing said writing beam control relay under the control of said relay means, whereby said writing beam control relay controls the presence of said electron beam responsive to said relay means.

5. A protection circuit for an electron beam image scanning device having a rotatable antenna, a fixed yoke and resolved sweep scanning circuity including north, south, east and west sweep signal amplifiers comprising:

isolation amplifier means coupled to each of said north, south, east and west sweep signal amplifiers;

first and second driver amplifier means coupled to said isolation amplifier means;

first and second filter means coupled to said first and second driver amplifier means, respectively, for rectifying and filtering signals coupled thereto;

relay means having a first and second winding coupled to said first and second filter means, respectively, said relay means operated in response to the sum of currents flowing in said first and second windings reaching a predetermined value;

writing beam control means for controlling the presence of said electron beam in said device;

an energizing circuit including said writing beam control means and said relay means for energizing said writing beam control means under the control of said relay means;

delay timer means included in said energizing circuit for opening said energizing circuit after a predetermined delay interval in the event of improper antenna rotation; and means for energizing said delay timer means including means for detecting and indicating improper antenna rotation and means responsive to said indication to couple a source of potential to said delay timer means, whereby said writing beam control means controls the presence of said electron beam in said device responsive to said relay means and delay timer means.

6. A protection circuit for an electron beam image scanning device having a rotatable antenna, a fixed yoke and resolved sweep scanning circuitry including north, south, east and west sweep signal amplifiers comprsing:

isolation amplifier means coupled to each of said north, south, east and west sweep signal amplifiers;

first and second driver amplifier means;

a gated clamp circuit coupled to said isolation amplifier means for coupling signals to said first and second driver amplifier means;

means coupled to said gated clamp circuit for coupling gating signals thereto;

first and second filters means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said electron beam in said device;

an energizing circuit including said writing beam control means and said relay means for energizing said writing beam control means under the control of said relay means;

delay timer means included in said energizing circuit for opening said energizing circuit after a predetermined delay interval in the event of improper antenna rotation;

means for energizing said delay timer means including means for detecting and indicating improper antenna rotation and means responsive to said indication to couple a source of potential to said delay timer means, whereby said writing beam control means controls the presence of said electron beam in said device responsive to said relay means and said delay timer means.

7. In a radar control system having a radar writing electron beam image scanning device and a television reading electron beam image scanning device, said radar writing electron beam image scanning device including a fixed yoke and resolved sweep scanning circuitry having north, south, east and west sweep signal amplifiers, a protection circuit for said radar control system comprising:

isolation amplifier means coupled to each of said north, south, east and west sweep signal amplifiers;

first and second driver amplifier means coupled to said isolation amplifier means;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said electron beam in said radar device;

an energizing circuit including said writing beam control means and said relay means for energizing said writing beam control means under the control of said relay means, reading beam control means for controlling the presence of said reading electron beam in said television device;

detecting means for detecting and indicating the failure of sweep signals for said reading electron beam; and a second energizing circuit including said reading beam control means and said detecting means for energizing said reading beam control means under the control of said detecting means.

8. In a radar control system having a rotatable antenna, a radar writing electron beam image scanning device and a television reading electron beam image scanning device, said radar writing electron beam image scanning device including a fixed yoke and resolved sweep scanning circuitry having north, south, east and west sweep signal amplifiers, a protection circuit for said radar control system comprising:

isolation amplifier means coupled to each of said north, south, east and west sweep signal amplifiers;

first and second driver amplifier means coupled to said isolation amplifier means;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said writing electron beam in said radar device;

an energizing circuit including said writing beam control means and said relay means for energizing said writing beam control means under the control of said relay means, delay timer means included in said energizing circuit for opening said energizing circuit after a predetermined delay interval in the event of improper antenna rotation;

means for energizing said delay timer including means for detecting and indicating improper antenna rotation and means responsive to said indication to couple a source of potential to said delay timer means;

reading beam control means for controlling the presence of said reading electron beam;

detecting means for detecting and indicating the failure of sweep signals for said reading electron beam; and an energizing circuit including said reading beam control means and said detecting means for energizing said reading beam control means under the control of said detecting means.

9. In a radar control system having a rotatable antenna, a radar writing electron beam image scanning device and a television reading electron beam image scanning device, said radar writing electron beam image scanning device including a fixed yoke and resolved sweep scanning circuitry having north, south, east and west sweep signal amplifiers, a protection circuit for said radar control system comprising:

isolating amplifier means coupled to each of said north, south, east and west sweep signal amplifiers;

first and second driver amplifier means;

a gated clamp circuit coupled to said isolation amplifier means for coupling signals to said first and second driver amplifier means;

means coupled to said gated clamp circuit for coupling gating signals thereto;

first and second filter means coupled to said first and second driver amplifier means, respectively, for rectifying and filtering signals coupled thereto;

relay means having a first and a second winding coupled to said first and second filter means, respectively, said relay means operated in response to the sum of currents flowing in said first and second windings reaching a predetermined value;

writing beam control means for controlling the presence of said writing electron beam in said radar device;

an energizing circuit including said writing beam control means and said relay means for energizing said writing beam control means under the control of said relay means, delay timer means included in said energizing circuit for opening said energizing circuit after a predetermined delay interval in the event of improper antenna rotation;

means for energizing said delay timer means including means for detecting and indicating improper antenna rotation and means responsive to said indication to couple a source of potential to said delay timer means;

reading beam control means for controlling the presence of said reading electron beam;

detecting means for detecting and indicating the failure of sweep signals for said reading electron beam; and an energizing circuit including said reading beam control means and said detecting means for energizing said reading beam control means under the control of said detecting means.

References Cited in the file of this patent

UNITED STATES PATENTS

| | | |
|---|---|---|
| 2,607,018 | Stolze | Aug. 12, 1952 |
| 2,709,768 | King | May 31, 1955 |
| 2,810,858 | Stein et al. | Oct. 22, 1957 |
| 2,882,445 | Sprengeler et al. | Apr. 14, 1959 |
| 2,913,621 | Luther et al. | Nov. 17, 1959 |
| 2,940,004 | Bonner | June 7, 1960 |